Dec. 16, 1941.  E. S. SMITH  2,266,090
ELECTRIC HEATING DEVICE
Filed Feb. 16, 1940  2 Sheets-Sheet 1
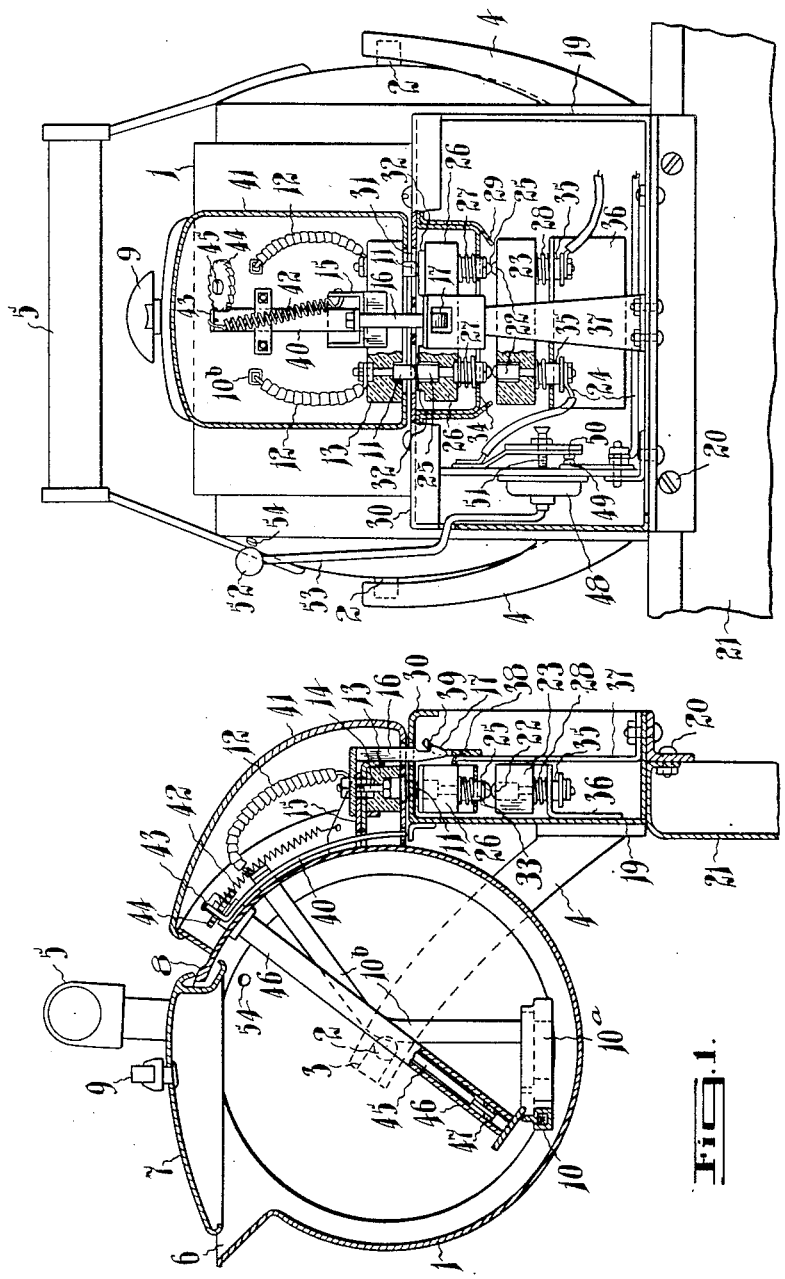
Inventor
E. S. Smith
by J. Edw. Maybee
ATTY.

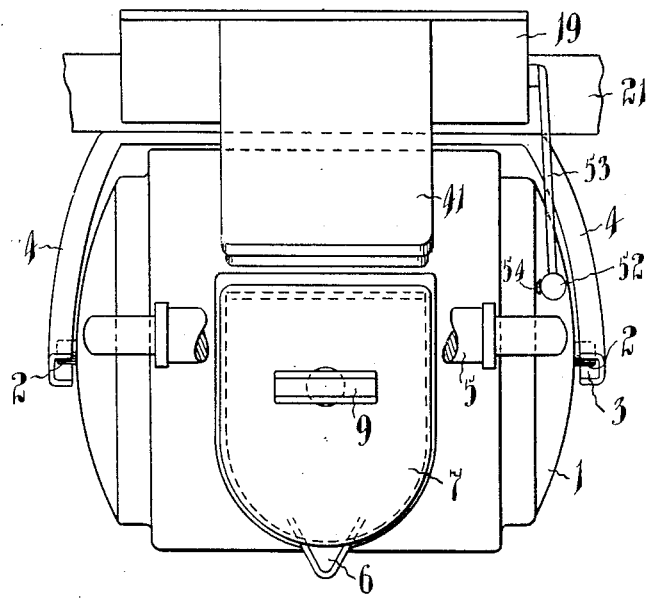
Fig. 3.
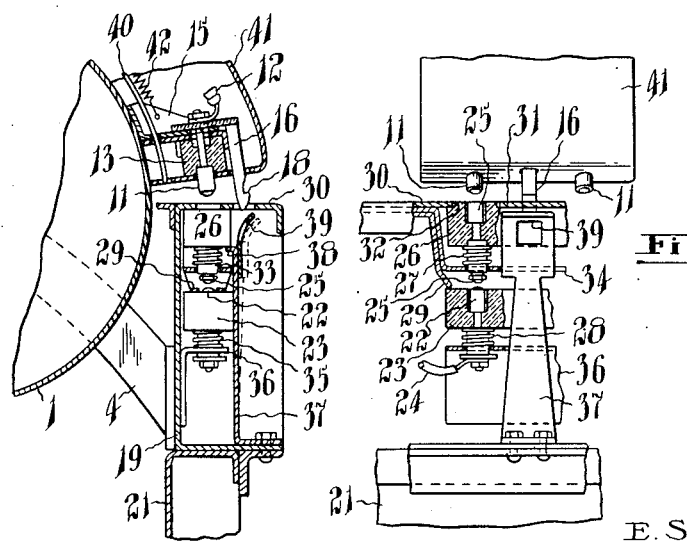
Fig. 5.
Fig. 1.
Inventor
E. S. Smith
by J Edw Maybee
ATTY Patented Dec. 16, 1941

2,266,090

UNITED STATES PATENT OFFICE 2,266,090

ELECTRIC HEATING DEVICE

Elmore Stanley Smith, Weston, Ontario, Canada, assignor to Moffats Limited, Weston, Ontario, Canada Application February 16, 1940, Serial No. 319,209

15 Claims. (Cl. 219—43)

This invention relates to electric heating devices and more particularly to those having an electric element permanently carried thereby for heating liquids and my object is to devise a device of this character in which the element is connected with and disconnected from a source of supply by the action of moving the liquid carrying device relative to a stationary support on which it is carried, and in which the connections for energizing the heating element are so arranged that live connections cannot be contacted accidentally by an operator, yet the connections may be engaged and disengaged with a minimum amount of movement of the liquid carrying device, and dirt and grease are excluded from the connections. A further object is to provide means for keeping the liquid at the boiling point, and to provide means for cutting off the electric energy to the element should the liquid carrying device become dry.

I attain my objects by providing a support on which a fluid container having an electric heating element is movable to connect and disconnect the supply of energy to the element. The latter is connected with contacts which are carried by the container and are adapted to engage and move connectors to energize the element when the container is moved to its operative position on the support. The electric supply is connected with terminals normally spaced from the connectors and adapted to be engaged thereby when they are moved by the contacts so that current will be supplied to the heating element when the container is moved to electrically connect the contacts, connectors and terminals.

The construction is hereinafter more fully described and is illustrated in the accompanying drawings in which Fig. 1 is a cross section of the device showing it in its operative position and attached to a splash plate of a stove;

Fig. 2 a rear elevation of the parts shown in Fig. 1;

Fig. 3 a plan view of part of Fig. 1;

Fig. 4 a detail of the device showing the electrical connections in their "off" positions; and Fig. 5 a rear view of part of the housing showing the electrical connections in their "off" positions.

In the drawings like numerals of reference indicate the corresponding parts in the different figures.

1 is a liquid container or kettle provided with trunnions 2 which are journalled in slots 3 formed in the free ends of the supporting arms 4. The kettle is provided with a handle 5 to facilitate the turning thereof and the insertion and withdrawal of the trunnions in and from the slots 3. By turning the kettle on its trunnions, liquid may be poured through the spout 6 without removing the kettle from the arms 4. The kettle is also provided with a lid 7 which is hinged on a lip 8 in such manner that it may readily be swung to an open position or removed therefrom. The lid is provided with a handle or finger grip 9. Within the kettle is suitably supported an immersion electric heating element 10 of the sheathed type having a grid-like portion 10a positioned adjacent the bottom of the kettle and lead portions 10b extending through the wall of the kettle at its upper side. The resistance wire of the element projects beyond the ends of the portions 10b and each end of the wire is connected with a contact 11. The ends of the wire are passed through insulating beads 12 and the contacts are carried on and extend through a block 13 of insulating material. This block is secured by a screw 14 to a bracket 15 which projects rearwardly from the rear wall of the kettle and is secured thereto. To the bracket 15 is secured a finger 16 depending at the rear of the block 13 and provided with an inclined end 17 and a shoulder 18 for purposes which will hereinafter appear.

The supporting arms 4 are secured to a casing 19 which may be secured by bolts 20 to a splash plate 21 of a stove or to any other stationary device. Within the casing two terminals 22 carried by and extending through an insulating block 23 are connected with lead-in wires 24 for supplying energy to said terminals. Between the latter and the element contacts 11 are interposed connectors 25 which are adapted to be engaged and moved by the contacts 11 into engagement with the terminals when the kettle is rocked back on its trunnions 2. The connectors 25 are carried by an insulating block 26 which is urged upwardly by springs 27 away from the lower terminal block 23 and the upper ends of the terminals so that normally the terminals and connectors are separated. Preferably the terminal block 23 is also urged by springs 28 towards the connector block 26 and stops 29 are provided to limit the upward movement of the block 23 and ensure the separation of the terminals and the connectors when they are not positively held in engagement with one another.

The upward movement of the connector block 26 is limited by a plate 30 forming the top of the casing 19. The plate is provided with two openings 31 which are adapted for the passage of the contacts 11 therethrough and to receive two bosses 32 on the upper side of the connector block 26 so that the upper surfaces of the bosses will be normally flush with the upper surface of the plate. The springs 27 normally move the block to bring the portion of its upper surface, between the bosses into engagement with the under surface of the plate. The bosses substantially fill the openings 31 to prevent dirt and grease from passing therethrough.

Each connector 25 comprises a head which may be provided with a silver top and a threaded shank which passes through a hole in the block 26 and through an insulating hub 33. The hole in the block is counterbored to receive the head of the connector and the silver top thereof so that the latter is flush with the top of the boss. A nut threaded on the lower end of the connector shank secures the hub 33 to the block. The lower ends of the shanks may be provided with the silver caps for contact with the silver tops on the upper ends of the terminals 22. The springs 27 are disposed on the hubs 33. One end of each spring engages the underside of the connector block 26 and the other end of each spring engages a guide member 34 which is provided with openings for the passage and guidance of the hubs 33. The member 34 extends lengthwise beneath the connector block 26, is supported from the underside of the plate 30 and reinforces the stops 29 for the terminal block 23.

The terminals 22 are each provided with a head which may be provided with a silver top for contacting the silver cap on the lower end of the adjacent connector 25. The heads of the terminals are provided with threaded shanks which pass through holes in the terminal block 23 and in hubs 35 which are secured thereto by nuts threaded on said shanks. The hubs 35 are guided in openings formed in a guide bracket 36 secured to the inner wall of the casing 19. The springs 28 are disposed on the hubs 35 and engage the bracket 36 and the underside of the terminal block 23 to urge it towards its stops 29. The heads of the terminals 22 are received in the upper counterbored portions of the holes in the terminal block.

The contacts 11 are provided with heads at their lower ends which heads are received in counterbores in the lower part of the contact block 13 and depend therefrom for passing through the openings 31 in the plate 30. The lower ends of the heads may be provided with silver caps for contact with the upper ends of the connectors 25 when the kettle is rocked on its trunnions 2. The upper threaded ends of the contacts 11 pass through holes in the contact block and are provided with nuts to secure the ends of the element resistance wire to them and to secure the contacts to the block.

Normally the connector block 26 is positioned by its springs 27 with its bosses 32 and heads of the connectors 25 flush with the upper surface of the plate 30. Normally, the springs 28 position the terminal block 23 against the stops 29 so that the upper ends of the terminals 22 are spaced from the lower ends of the connectors 25. Should the kettle be removed from its supporting arms 4 or tilted thereon so that the block 13 is spaced from the connector block 26, the connectors 25 will be exposed but, since they are disengaged from the terminals 22, no electric current is flowing thereto and therefore they may be touched by an operator without any dangerous results.

To prevent the connector block 26 from being depressed to cause the connectors 25 to contact with the "live" terminals 22 except by the engagement of the contacts 11 with the connectors, I provide releasable means for holding the connectors out of engagement with the terminals. Such means comprises a spring arm 37 carrying a projection 38 which engages the underside of the connector block. The spring arm is secured at its lower end to the bottom of the casing 19 and its upper end is inclined outwardly for engagement by the inclined end 17 of the finger 16 when the kettle is rocked to bring its contacts 11 into engagement with the connectors 25. The finger 16 is adapted to flex the spring arm sufficiently to move the projection 38 out of the path of the connector block 26 whereby the latter will be depressed by the contacts 11 against the compression of the springs 27. The continued movement of the kettle will result in the terminals 22 being engaged and moved by the connectors 25 against the compression of the springs 28. By mounting the terminal block 23 so that it is moved by the connectors, a good electrical connection between the connectors and the terminals 22 is ensured even should these parts become shorter in length due to wear on the contacting portions.

To releasably lock the kettle in its operative position in which the contacts 11, connectors 25 and terminals 22 are electrically connected, the spring arm 37 is provided with a shoulder 39 adapted to be frictionally engaged by the shoulder 18 on the finger 16. In the inclined end of the arm 37 is formed a slot, adapted to receive the inclined end 17 of the finger 16 after it has flexed the arm, and the upper edge of the slot forms the shoulder 39. By rocking the kettle in an anti-clockwise direction of rotation in Fig. 1, as illustrated in Figs. 4 and 5, the shoulders 18 and 39 are disengaged whereupon the blocks 26 and 23 are returned by their springs to their normal inoperative positions, the connectors 25 and terminals 22 are thus separated, and the kettle may be removed from the arms 4.

The connectors 25 and terminals 22 are automatically disconnected to de-energize the element 10 should the kettle become dry or the element overheat otherwise. A curved arm 40 is suitably guided in openings formed in the bracket 15 and in the lower wall of the housing 41 which encloses the contact block 13 and the electrical connections between the block and the heating element 10. The arm 40 follows the contour of the adjacent part of the wall of the kettle and is adapted to be actuated by a spring 42, connected with the arm and the bracket 15, to engage the casing 19 and cause the shoulder 18 on the finger 16 to disengage the shoulder 39 on the spring arm 37. The arm 40 is provided with a lip 43 which engages a tooth of a toothed wheel 44. The latter is secured to a spindle 45 which is adapted to rotate in a tube 46 but is normally restrained from rotation therein as hereinafter described. The tube 46 is carried by the upper portion of the kettle wall and has its lower end closed and in contact with the heating element 10. Solder 47, or other suitable material having a low melting point, is carried in the lower end of the tube to releasably connect the spindle therewith. The diameter of the spindle near its lower end is reduced to increase the thickness of the solder between the tube and said reduced portion of the spindle. Immediately the kettle becomes dry, the heat of the element 10 will melt the solder in the tube and permit the spindle to rotate under the action of the spring 42 whereby the lip 43 will disengage itself from the toothed wheel 44 and the arm 40 will engage the stationary casing 19 to cause the kettle to be turned on its trunnions. The initial turning movement of the kettle will release the finger shoulder 18 from the arm shoulder 39 and the continued turning movement of the kettle will permit the springs 27 to move the connector block 26 so that the projection 38 on the spring arm 37 will again move into engagement with the underside of the block 26. The lip 43 of the spring actuated arm 40 may be readily re-engaged with a tooth of the toothed wheel 44 when the solder resets in the tube 46 to re-connect the spindle 45 therewith. The spring 42 is thus reset and held inoperative by the solder until it is again melted. The said lower-wall of the housing 41 is also provided with openings to clear the contacts 11 which extend beneath the housing.

To save current and to tend to prevent the kettle from boiling dry, a vapour pressure actuated switch 48 of well known type is connected in one of the lead-inwires 24 to the terminals 22. The switch comprises a fixed contact 49 and a movable contact 50, the latter being carried on an arm having an adjusting screw connection 51 with a diaphragm (not shown). The diaphragm is actuated by vapour pressure generated in a metallic ball 52 connected by a tube 53 with the switch 48. Steam emitted from a small opening 54 formed in the upper wall of the kettle impinges against the ball 52 to generate the vapour pressure therein which actuates the switch 48 to de-energize the heating element 10. As the liquid in the kettle cools, the steam ceases to issue through the opening whereupon the switch 48 automatically closes again and the cycle is repeated until the kettle is manually or automatically tilted to separate the connectors 25 from the terminals 22.

The kettle may be filled and emptied without removing it from the supporting arms 4. After the desired liquid is inserted, the kettle is tilted to cause the finger 16 to release the projection 38 from the connector block 26. The continued rocking movement of the kettle then engages the contacts 11 with the connectors 25, then the latter with the terminals 22, and finally the shoulder 18 with the shoulder 39. The heating element is thus energized and the kettle is releasably locked in its operative position. The contents may be poured from the kettle by rocking the latter to release the finger shoulder 18 from the shoulder 39 and continuing the rocking movement until the liquid flows out the spout 6. If the operator should not be at hand when the liquid boils, the switch 48 will intermittently operate to keep the liquid at the boiling point. Should the kettle boil dry, the solder 47 will melt to release the spring actuated arm 40 which releases the shoulder 18 from the shoulder 39 and permits the springs 27 to separate the connectors 25 from the terminals 22.

What I claim as my invention is:

1. An electric heating device comprising a support; a fluid container movable relative to said support; an electric heating element carried by said container; contacts connected with the heating element and carried by the container; a casing having an opening for the passage therethrough of said contacts on movement of the container to its operative position; electric supply terminals mounted in the casing in spaced relationship to said contacts; movable connector means in said casing adapted to close the opening and being interposed between said contacts and said terminals for engagement therewith to electrically connect them, said means being normally spaced from the terminals and being adapted to be engaged and moved by the contacts to engage said terminals so that the terminals, connector means and contacts are electrically connected when the container is in its operative position; and means for releasably holding the connector means out of engagement with the terminals when the container is moved to an inoperative position.

2. An electric heating device comprising a support; a fluid container movable relative to said support; an electric heating element carried by said container; contacts connected with the heating element and carried by the container; a casing having an opening for the passage therethrough of said contacts on movement of the container to its operative position; electric supply terminals mounted in the casing in spaced relationship to said contacts; movable connector means in said casing adapted to close the opening and being interposed between said contacts and said terminals for engagement therewith to electrically connect them, said means being normally spaced from the terminals and being adapted to be engaged and moved by the contacts, on movement of the container to its operative position, to engage said terminals so that the terminals, connector means and contacts are electrically connected when the container is in its operative position; means for releasably holding the connector means out of engagement with the terminals when the container is moved to an inoperative position; and means for releasing the holding means when the container is moved to bring the contacts into engagement with the connector means.

3. An electric heating device comprising a support; a fluid container carried by said support and movable relative thereto; an electric heating element carried by said container; contacts connected with the heating element and carried by the container; a casing having an opening for the passage therethrough of said contacts on movement of the container to its operative position; electric supply terminals mounted in the casing in spaced relationship to said contacts; connector means slidably mounted in the casing between said terminals and contacts and being adapted to close the opening, said means being initially separated from the terminals and being adapted to establish electric connections between the terminals and contacts when the connector means are engaged and moved by the contacts on movement of the container to its operative position; releasable means for holding the connector means out of engagement with the terminals when the container is moved to an inoperative position; means carried by the container for releasing the releasable means when the container is moved to bring the contacts into engagement with the connector means; and means for releasably locking the container in its operative position to electrically connect said contacts, connector means and terminals, the means for releasably locking the container comprising two shoulders adapted to be frictionally engaged, one of said shoulders being on the said releasable means and the other on the releasing means.

4. An electric heating device comprising a support; a fluid container carried by said support and movable relative thereto; an electric heating element carried by said container; contacts connected with the heating element and carried by the container; a casing having an opening for the passage therethrough of said contacts on movement of the container to its operative position; electric supply terminals slidably mounted in the casing in spaced relationship to said contacts; connector means slidably mounted in the casing between said terminals and the contacts and being adapted to close the opening, said means being initially separated from the terminals and being adapted to establish electric connections between the terminals and the contacts when the connector means are engaged and moved by the contacts on movement of the container to its operative position; stop means for limiting the movement of the terminals in a direction towards the connector means; releasable means for holding the connector means out of engagement with the terminals when the container is moved to an inoperative position; and means carried by the container for releasing the releasable means when the container is moved to bring the contacts into engagement with the connector means.

5. An electric heating device comprising a support; a fluid container carried by said support and movable relative thereto; an electric heating element carried by said container; contacts connected with the heating element and carried by the container; electric supply terminals slidably mounted on a suitable stationary part; stop means for limiting the movement of the terminals in a direction towards the contacts; spring means tending to move the terminals into engagement with the stop means; connector means slidably mounted between said terminals and contacts on a stationary part; spring means tending to move the connector means in a direction away from the terminals; means for limiting the movement of the connector means imparted thereto by the second mentioned spring means so that normally the connector means and terminals are separated, the connector means being adapted to establish electric connections between the terminals and contacts when the connector means are engaged and moved by the contacts into engagement with the terminals; releasable means for holding the connector means out of engagement with the terminals; and means carried by the container for releasing the releasable means when the container is moved to bring the contacts into engagement with the connector means.

6. An electric heating device comprising a support; a fluid container carried by said support and movable relative thereto; an electric heating element carried by said container; contacts connected with the heating element and carried by the container; a stationary plate having openings therethrough; a block of insulating material slidably mounted beneath the plate and having bosses on its top side adapted to be received in the openings and be flush with the upper surface of the plate; connectors carried by and extending through said block for engagement by said contacts; electric supply terminals mounted on and insulated from a stationary part adapted to be engaged by the ends of the connectors remote from the contacts to establish electric connection between the terminals and contacts when the connector means are engaged and moved by the contacts; and means for releasably locking the block in its inoperative position with its bosses flush with the plate and its connectors spaced from the terminals.

7. An electric heating device comprising a support; a fluid container carried by said support and movable relative thereto; an electric heating element carried by said container; contacts connected with the heating element and carried by the container; a stationary plate having openings therethrough; a block of insulating material slidably mounted beneath the plate and having bosses on its top side adapted to be received in the openings and be flush with the upper surface of the plate; connectors carried by and extending through said block for engagement by said contacts; electric supply terminals mounted on and insulated from a stationary part adapted to be engaged by the ends of the connectors remote from the contacts to establish electric connection between the terminals and contacts when the connector means are engaged and moved by the contacts; means for releasably locking the block in its inoperative position with its bosses flush with the plate and its connectors spaced from the terminals; means carried by the container for releasing said locking members when the container is moved to bring the contacts into engagement with the connectors; and means for releasably locking the container in its operative position.

8. An electric heating device comprising a support; a fluid container carried by said support and movable relative thereto; an electric heating element carried by said container; contacts connected with the heating element and carried by the container; a stationary plate having openings therethrough; a block of insulating material slidably mounted beneath the plate and having bosses on its top side adapted to be received in the openings and be flush with the upper surface of the plate; connectors carried by and extending through said block for engagement by said contacts; a second block of insulating material slidably mounted beneath the first block; electric supply terminals carried by said second block adapted to be engaged by the ends of the connectors remote from the contacts; stop means for limiting the movement of the second block in a direction towards the first block; spring means urging said second block towards its stop means; spring means urging said first block towards the plate to separate the connectors and terminals; and means for releasably locking the first block in its inoperative position with its bosses flush with the plate and its connectors separated from the terminals.

9. An electric heating device comprising a support; a fluid container carried by said support and movable relative thereto; an electric heating element carried by said container; contacts connected with the heating element and carried by the container; a stationary plate having openings therethrough; a block of insulating material slidably mounted beneath the plate and having bosses on its top side adapted to be received in the openings and be flush with the upper surface of the plate; connectors carried by and extending through said block for engagement by said contacts; a second block of insulating material slidably mounted beneath the first block; electric supply terminals carried by said second block adapted to be engaged by the ends of the connectors remote from the contacts; stop means for limiting the movement of the second block in a direction towards the first block; spring means urging said second block towards its stop means; spring means urging said first block towards the plate to separate the connectors and terminals; means for releasably locking the first block in its inoperative position with its bosses flush with the plate and its connectors separated from the terminals; means carried by the container for releasing said locking means when the container is moved to bring the contacts into engagement with the connectors; and means for releasably locking the container in its operative position.

10. An electric heating device comprising a pivoted kettle; an electric heating element carried by the kettle; contacts connected with the heating element and carried by the kettle; means including connectors adapted to be engaged by the contacts to supply electric energy to the element when the kettle is rocked to its operative position; and spring actuated means including a heat controlled device controlled by the element for positively rocking the kettle to disengage the contacts from the connectors when the element overheats.

11. An electric heating device comprising a pivoted kettle; an immersion electric heating element of the sheathed type in said kettle; contacts connected with the heating element and carried by the kettle; electric supply terminals spaced from said contacts; movable connector means interposed between said contacts and terminals for engagement therewith to electrically connect them, said means being normally spaced from the terminals and being adapted to be moved by the contacts to engage said terminals when the kettle is rocked to its operative position; means for releasably holding the connector means out of engagement with the terminals; and means carried by the kettle for releasing the holding means as the kettle is rocked to its operative position to electrically connect the contacts, connector means and terminals.

12. An electrical heating device comprising a pivoted kettle; an immersion electric heating element of the sheathed type in the container; contacts connected with the heating element and carried by the kettle; a casing; connector means slidably mounted in said casing adapted to be engaged and moved by said contacts; electric supply terminals mounted in said casing for engagement by said connector means when they are moved by the contacts; a spring arm having a projection for engaging the connector means to hold it out of engagement with the terminals; a finger carried by the kettle for engaging the spring arm to move the projection out of the path of the connector means when the kettle is turned to cause the contacts to engage the connector means; shoulders on the spring arm and the finger for frictionally holding the kettle when the connector means engage the terminals; a spring actuated arm guided on the kettle to move relative thereto, the arm being adapted to engage the casing to cause the shoulders to be disengaged; and means for normally retaining the spring actuated arm inoperative, said last mentioned means including a heat controlled device contacting the element in the kettle so that the spring actuated arm will be released to cause the connector means to be separated from the terminals should the element be overheated.

13. An electric heating device comprising a support; a fluid container movable relative to said support; an electric heating element carried by said container; contacts connected with the heating element and carried by the container; electric supply terminals spaced from said contacts; movable connector means interposed between said contacts and terminals for engagement therewith to electrically connect them, said means being normally spaced from the terminals and being adapted to be engaged and moved by the contacts to engage said terminals; means for releasably holding the connector means out of engagement with the terminals, said holding means comprising a spring arm secured to a stationary part and having a projection for engaging the connector means at the side opposite that side engaged by the contacts; a shoulder on said arm; a finger carried by the container and having an inclined end for engaging the spring arm to move the projection out of the path of the connector means; and a shoulder on said finger adapted to frictionally engage the shoulder on the arm to releasably retain the container in its operative position.

14. An electric heating device comprising a support; a fluid container movable relative to said support; an electric heating element carried by said container; contacts connected with the heating element and carried by the container; a casing having an opening for the passage therethrough of said contacts when the container is moved to its operative position; electric supply terminals mounted in the casing in spaced relationship to said contacts; and movable connector means mounted in the casing and adapted to close the opening, said means being in alinement with the terminals and being normally spaced therefrom and being adapted to be engaged and moved by the contacts to engage said terminals so that the contacts, connector means and terminals are electrically connected when the container is in its operative position.

15. An electric heating device comprising a pivoted kettle; an immersion electric heating element of the sheathed type in said kettle; contacts connected with the heating element and carried by the kettle; a casing having an opening for the passage therethrough of said contacts when the kettle is rocked to its operative position; electric supply terminals in the casing in spaced relationship to said contacts; and movable connector means mounted in said casing and adapted to close the opening, said means being in alinement with the terminals and being normally spaced therefrom and being adapted to be engaged and moved by the contacts to engage said terminals so that the contacts, connector means and terminals are electrically connected when the kettle is in its operative position.

ELMORE STANLEY SMITH.